United States Patent
Yang

(10) Patent No.: US 11,844,010 B2
(45) Date of Patent: *Dec. 12, 2023

(54) RELAY TRANSMISSION METHOD AND RELAY NODE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,246

(22) Filed: Sep. 28, 2022

(65) Prior Publication Data
US 2023/0025855 A1    Jan. 26, 2023

Related U.S. Application Data

(63) Continuation of application No. 16/919,645, filed on Jul. 2, 2020, now Pat. No. 11,510,129, which is a
(Continued)

(30) Foreign Application Priority Data

Jan. 9, 2018   (WO) ................ PCT/CN2018/071973
Apr. 18, 2018  (WO) ................ PCT/CN2018/083559

(51) Int. Cl.
H04W 40/22    (2009.01)
H04B 7/155    (2006.01)

(52) U.S. Cl.
CPC ............ *H04W 40/22* (2013.01); *H04B 7/155* (2013.01)

(58) Field of Classification Search
None
See application file for complete search history.

(56) References Cited

U.S. PATENT DOCUMENTS 11,510,129 B2 * 11/2022 Yang ................... H04W 40/22
2008/0285500 A1 * 11/2008 Zhang ................. H04W 84/047
                                                      455/7
(Continued)

FOREIGN PATENT DOCUMENTS

CN    101111047 A    1/2008
CN    101415150 A    4/2009
(Continued)

OTHER PUBLICATIONS

International Search Report for PCT/CN2018/071973 dated Sep. 27, 2018.
(Continued)

*Primary Examiner* — Minh Trang T Nguyen
(74) *Attorney, Agent, or Firm* — Young Basile Hanlon & MacFarlane, P.C.

(57) ABSTRACT

Described are a method for relay transmission and a relay node. The method comprises: a relay layer of a first node receives target data sent by a second node, wherein the second node is an anchor node or a relay node, the first node is wirelessly connected to the second node, the anchor node is wiredly connected to a core network, and a destination node of the target data is a third node; and the relay layer of the first node processes the received target data.

19 Claims, 4 Drawing Sheets

200

A relay layer of a first node receives target data sent by a second node, wherein the second node is an anchor node or a relay node, the first node is wirelessly connected with the second node, the anchor node is wiredly connected with a core network, and a destination node of the target data is a third node — S210

The relay layer of the first node processes the received target data — S220

Related U.S. Application Data continuation of application No. PCT/CN2018/092131, filed on Jun. 21, 2018.

(56) References Cited

U.S. PATENT DOCUMENTS

| | | | |
|---|---|---|---|
| 2014/0169265 | A1 | 6/2014 | Park et al. |
| 2018/0184359 | A1 | 6/2018 | Hessler et al. |
| 2019/0387446 | A1 | 12/2019 | Xu et al. |

FOREIGN PATENT DOCUMENTS

| | | | |
|---|---|---|---|
| CN | 101527621 | A | 9/2009 |
| CN | 101715630 | A | 5/2010 |
| CN | 102195704 | A | 9/2011 |
| CN | 105393633 | A | 3/2016 |
| CN | 105657865 | A | 6/2016 |
| CN | 106304242 | A | 1/2017 |
| EP | 3934125 | A2 | 1/2022 |
| WO | 2011000406 | A1 | 1/2011 |
| WO | 2016209136 | A1 | 12/2016 |
| WO | 2017014716 | A1 | 1/2017 |

OTHER PUBLICATIONS

International Search Report for PCT/CN2018/092131 datd Oct. 8, 2018.
International Search Report for PCT/CN2018/083559 dated Sep. 25, 2018.
8881123GPP TSG RAN Meeting #75; RP-170821; Dubrovnik, Croatia, Mar. 6-9, 2017.
Extended European Search Report for EP Application 18899862.9 dated Dec. 14, 2020.
Australian Examination Report for AU Application 2018402241 dated Jan. 29, 2021.
Indian Examination Report for IN Application 202017030874 dated Jul. 2, 2021. (5 pages).
Korean Office Action with English Translation for KR Application 10-2020-7020728 dated Apr. 19, 2021. (15 pages).
3GPP TR 36.806 V9.0.0 (Mar. 2010); 3GPP TR 36.806 V9.0.0 (Mar. 2010); XP050912593.
Korean First Final Rejection with English Translation for KR Application 1020207020728 dated Oct. 5, 2021.
Japanese First Office Action with English Translatin for JP Application 2020537549 dated Jul. 20, 2021.
Chinese Second Office Action with English Translation for CN Application 202010727866.8 dated Oct. 8, 2021.
Chinese First Office Action with English Translation for CN Application 202010727866.8 dated Jul. 23, 2021.
Canadian First Examiners Report for CA Application 3087853 dated Jul. 16, 2021.
Australian Examination for AU Application 2018402241 dated Jul. 26, 2021.
Korean Office Action with English Translation for KR Application 1020207020728 dated Nov. 15, 2021. (15 pages).
Japanese Office Action with English Translation for JP Application 2020537549 dated Dec. 17, 2021. (8 pages).
Chinese Third Office Action with English Translation for CN Application 202010727866.8 dated Dec. 10, 2021. (9 pages).
Australian Examination Report for AU Application 2018402241 dated Nov. 1, 2021. (5 pages).
Communication pursuant to Article 94(3) EPC for EP Application 18899862.9 dated Mar. 23, 2022. (6 pages).
Australian Examination Report No. 4 for AU Application 2018402241 dated Jan. 24, 2022. (3 pages).
Canadian Second Examiners Report for CA Application 3087853 dated Apr. 25, 2022. (5 pages).
Japanese Decision of Refusal with English Translation for JP Application 2020537549 dated Jul. 5, 2022. (6 pages).
Korean Office Action with English Translation for KR Application 1020207020728 dated May 25, 2022. (10 pages).
Written Opinion and Search Report with English Translation for PCT/CN2018/092131 dated Oct. 8, 2018.
Communication pursuant to Article 94(3) EPC, examination of EP Application 18899862.9 dated Sep. 9, 2022.
U.S. Non Final Office Action for U.S. Appl. No. 16/919,645 dated Aug. 5, 2021.
U.S. Final Office Action for U.S. Appl. No. 16/919,645 dated Jan. 21, 2022.
U.S. Non Final Office Action for U.S. Appl. No. 16/919,645 dated Mar. 30, 2022.
U.S. Notice of Allowance and Fee Due for U.S. Appl. No. 16/919,645 dated Jul. 25, 2022.
U.S. Supplemental Notice of Allowance and Fee Due for U.S. Appl. No. 16/919,645 dated Aug. 12, 2022.
U.S. Supplemental Notice of Allowability for U.S. Appl. No. 16/919,645 dated Oct. 13, 2022. (6 pages).
Japanese Reconsideration Examination Report with English Translation for JP Application 2020537549 dated Nov. 22, 2022. (7 pages).
Written Opinion with English Translation for PCT Application PCT/CN2018/083559 dated Sep. 25, 2018. (7 pages).
Written Opinion with English Translation for PCT Application PCT/CN2018/071973 dated Sep. 27, 2018. (6 pages).
Communication pursuant to Article 94(3) EPC for EP Application 18899862.9 dated Jan. 30, 2023. (9 pages).
Canadian Examination Report for CA Application 3087853 dated Feb. 21, 2023. (3 pages).
Communication pursuant to Article 94(3) EPC Examination for EP Application 18899862.9 mailed Jun. 28, 2023.
Korea Request for Submission of Opinion for Korean application 10-2022-7027918 mailed May 16, 2023.
Korea Decision on Appeal for Korean Application No. 10-2020-7020728 mailed May 15, 2023.

* cited by examiner

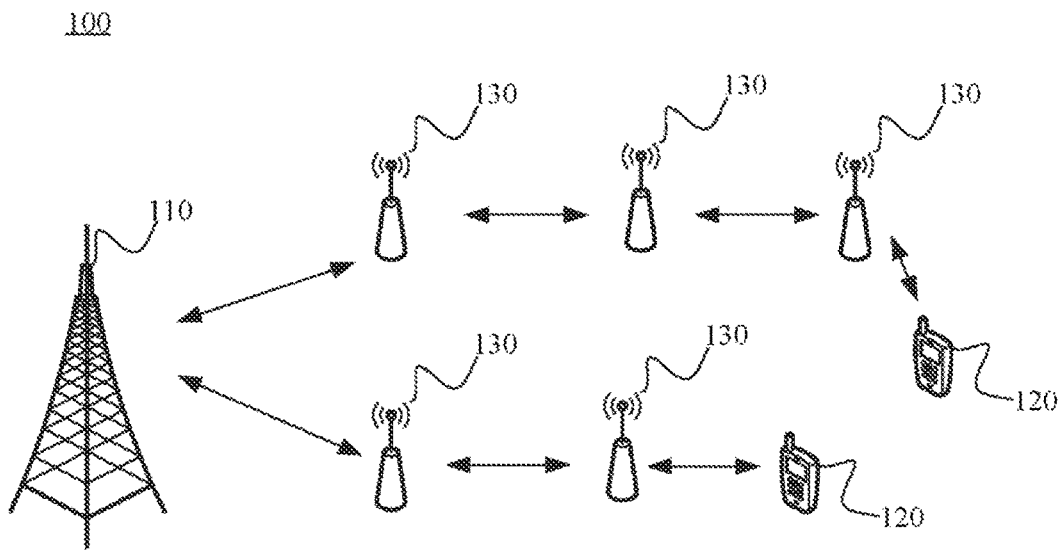

| A relay layer of a first node receives target data sent by a second node, wherein the second node is an anchor node or a relay node, the first node is wirelessly connected with the second node, the anchor node is wiredly connected with a core network, and a destination node of the target data is a third node | S210 |

| The relay layer of the first node processes the received target data | S220 |

FIG. 2

RELAY TRANSMISSION METHOD AND RELAY NODE

CROSS-REFERENCE TO RELATED APPLICATION(S)

This application is a continuation application of U.S. application Ser. No. 16/919,645, filed on Jul. 2, 2020, which is a continuation application of International Patent Application No. PCT/CN2018/092131, filed on Jun. 21, 2018, which claims priority to International Patent Application No. PCT/CN2018/071973, filed on Jan. 9, 2018, and International Patent Application No. PCT/CN2018/083559, filed on Apr. 18, 2018, the contents of all of which are incorporated herein by reference in their entireties.

TECHNICAL FIELD

Implementations of the present disclosure relate to the field of communication, and more particularly, to a method for relay transmission and a relay node.

BACKGROUND

In a Long Term Evolution (LTE) system, a relay technology is introduced to expand a coverage area of a cell. For example, a base station 1 may be wirelessly connected with a base station 2, and the base station 2 may be wiredly connected with a core network, so that the base station 1 may be connected with the core network through the base station 2. However, the LTE system only supports single-hop transmission paths and does not support multi-hop transmission paths.

A New Radio (NR) system and LTE system have different air interface protocols, and support for multi-hop transmission is required in the NR system. Therefore, how to realize relay communication in the NR system is an urgent problem to be solved.

SUMMARY

A method for relay transmission and a relay node are provided.

In a first aspect, a method for relay transmission is provided, including: receiving, by a relay layer of a first node, target data sent by a second node, wherein the second node is an anchor node or a relay node, the first node is wirelessly connected with the second node, the anchor node is wiredly connected with a core network, and a destination node of the target data is a third node; and processing, by the relay layer of the first node, the received target data.

In some possible implementations, the third node is a terminal device, or the third node is a relay node directly connected with the terminal device.

In some possible implementations, processing, by the relay layer of the first node, the received target data, includes: submitting, by the relay layer of the first node, the target data to an upper layer of the relay layer.

In some possible implementations, processing, by the relay layer of the first node, the received target data, includes: forwarding, by the relay layer of the first node, the target data to another relay node.

In one possible implementation, processing, by the relay layer of the first node, the received target data, includes: forwarding, by the relay layer of the first node, the target data to a terminal device, wherein the first node is directly connected with the terminal device.

In one possible implementation, forwarding, by the relay layer of the first node, the target data to the terminal device, includes: submitting, by the relay layer of the first node, the target data to an upper layer of the relay layer; and forwarding, by the upper layer of the relay layer, the target data to the terminal device.

In one possible implementation, the method further includes: determining, by the relay layer of the first node, a processing mode of the target data according to first indication information, wherein the processing mode of the target data is one of the following: forwarding the target data to the terminal device, forwarding the target data to another relay node, and submitting the target data to the upper layer of the relay layer.

In one possible implementation, the first indication information is used for indicating at least one of the following: a logical channel identification, whether the target data is sent to the first node, whether the target data is sent to the terminal device directly connected with the first node, whether the target data is sent to another relay node, whether the target data is carried on a Data Radio Bearer (DRB), whether the target data is carried on a Signaling Radio Bearer (SRB), an IP address, and port information in an IP message header.

In one possible implementation, the first indication information is contained in a message header of a Packet Data Unit (PDU) of at least one of the following protocol layers: a relay layer, a Medium Access Control (MAC) layer, a Radio Link Control (RLC) layer, and at least one upper layer of the relay layer.

In one possible implementation, the method further includes: if it is determined that the target data is not submitted to another relay node, determining, by the relay layer of the first node, to submit the target data to a first upper layer of the relay layer according to second indication information, wherein the first upper layer is one of at least one upper layer of the relay layer.

In one possible implementation, determining, by the relay layer of the first node, to submit the target data to the first upper layer of the relay layer according to the second indication information, includes: determining, by the relay layer of the first node, whether the target data needs to be forwarded to the terminal device according to the second indication information; and determining, by the relay layer of the first node, the first upper layer to which the target data is submitted according to whether the target data needs to be forwarded to the terminal device.

In one possible implementation, submitting, by the relay layer of the first node, the target data to the upper layer of the relay layer, includes: submitting, by the relay layer of the first node, the target data to the first upper layer.

That is, in the implementation, the relay layer of the first node may first determine to which upper layer the target data is submitted, and then may submit the target data to the upper layer. Optionally, the upper layer may further submit the target data upward, or may not submit the target data upward any more. Implementations of the present disclosure are not limited to this.

In one possible implementation, the second indication information is used for indicating at least one of the following: a logical channel identification, whether the target data is sent to the first node, whether the target data is sent to the terminal device directly connected with the first node, whether the target data is sent to another relay node, whether the target data is carried on a Data Radio Bearer (DRB), whether the target data is carried on a Signaling Radio Bearer (SRB), an IP address, port information in an IP message header, whether the target data is Radio Resource Control (RRC) data, and whether the target data is F1 Application Protocol (F1AP) data.

In one possible implementation, the second indication information is contained in a message header of a Packet Data Unit (PDU) of at least one of the following protocol layers: a relay layer, a Medium Access Control (MAC) layer, a Radio Link Control (RLC) layer, and at least one upper layer of the relay layer.

In one possible implementation, the method includes: if it is determined that the target data is not submitted to another relay node, submitting, by the relay layer of the first node, the target data to the upper layer of the relay layer; and determining, by the upper layer of the relay layer, to submit the target data to a second upper layer of the relay layer according to third indication information, wherein the second upper layer is one of at least one upper layer of the relay layer.

That is, in the implementation, the relay layer of the first node first submits the target data upward, and then the upper layer of the relay layer determines which upper layer to submit the target data to.

In one possible implementation, determining, by the upper layer of the relay layer, to submit the target data to the second upper layer of the relay layer according to the third indication information, includes: determining, by the upper layer of the relay layer, whether the target data needs to be forwarded to the terminal device according to the third indication information; and determining, by the upper layer of the relay layer, the second upper layer to which the target data is submitted according to whether the target data needs to be forwarded to the terminal device.

In one possible implementation, submitting, by the relay layer of the first node, the target data to the upper layer of the relay layer, includes: submitting, by the relay layer of the first node, the target data to the second upper layer.

In one possible implementation, the third indication information is used for indicating at least one of the following: a logical channel identification, whether the target data is sent to the first node, whether the target data is sent to the terminal device directly connected with the first node, whether the target data is sent to another relay node, whether the target data is carried on a Data Radio Bearer (DRB), whether the target data is carried on a Signaling Radio Bearer (SRB), an IP address, port information in an IP message header, whether the target data is Radio Resource Control (RRC) data, and whether the target data is F1 Application Protocol (F1AP) data.

In one possible implementation, the third indication information is contained in a message header of a Packet Data Unit (PDU) of at least one of the following protocol layers: a relay layer, a Medium Access Control (MAC) layer, a Radio Link Control (RLC) layer, and at least one upper layer of the relay layer.

In one possible implementation, at least one upper layer of the relay layer includes at least one of the following: an Internet Protocol (IP) layer, a Packet Data Convergence Protocol (PDCP) layer, a Service Data Adaptation Protocol (SDAP) layer, a Radio Resource Control (RRC) layer, a Non-Access Layer (NAS) layer, a User Data Packet Protocol (UDP) layer, a General Packet Radio Service Tunnel Protocol (GTP) layer, a Stream Control Transmission Protocol (SCTP) layer, and a F1 Application Protocol (F1AP) layer.

In one possible implementation, the upper layer of the relay layer includes at least one of the following: an Internet Protocol (IP) layer, a Packet Data Convergence Protocol (PDCP) layer, a Service Data Adaptation Protocol (SDAP) layer, a Radio Resource Control (RRC) layer, a Non-Access Layer (NAS) layer, a User Data Packet Protocol (UDP) layer, a General Packet Radio Service Tunnel Protocol (GTP) layer, a Stream Control Transmission Protocol (SCTP) layer, and a F1 Application Protocol (F1AP) layer.

In some possible implementations, the relay layer of the first node is above a Radio Link Control (RLC) layer of the first node.

In some possible implementations, the relay layer of the first node is implemented at a Packet Data Convergence Protocol (PDCP) layer.

In some possible implementations, the relay layer of the first node is below the PDCP layer.

In some possible implementations, the target data is transmitted between the first node and the second node through a point-to-point mode, and the target data is transmitted between the first node and a next hop node of the first node through a point-to-point mode, and the next hop node of the first node is another relay node or the terminal device.

In some possible implementations, the target data is transmitted between the anchor node and the third node through an end-to-end mode.

In some possible implementations, receiving, by the first node, the target data sent by the anchor node, includes: receiving, by the first node, the target data sent by the anchor node through a data connection of a terminal device.

In some possible implementations, the data connection of the terminal device is established between a PDCP entity of the terminal device and a PDCP entity of the anchor node.

In some possible implementations, the relay nodes directly connected with the terminal device do not perform a GTP layer processing on the target data.

In some possible implementations, the relay nodes directly connected with the terminal device perform a GTP layer processing on the target data.

In some possible implementations, the target data includes an address of the terminal device to which the target data belongs and/or the relay node directly connected with the terminal device.

In some possible implementations, the first node establishes a connection as a Distribution Unit (DU) with the anchor node as a Center Unit (CU).

In some possible implementations, an interface between the first node and the anchor node is a CU-DU interface.

In some possible implementations, receiving, by the first node, the data sent by the anchor node, includes: receiving, by the first node, the target data sent by the anchor node through data connection of the relay node directly connected with the terminal device.

In some possible implementations, the data connection of the relay node directly connected with the terminal device is established between a PDCP entity of the relay node directly connected with the terminal device and a PDCP entity of the anchor node.

In some possible implementations, the relay node directly connected with the terminal device is configured to perform GTP layer processing on the target data and forward the target data to the terminal device through a data bearer of the terminal device.

In some possible implementations, the target data includes an address of the terminal device to which the target data belongs and/or the relay nodes directly connected with the terminal device.

In some possible implementations, the first node as an access network device establishes a connection with the anchor node.

In some possible implementations, the access network device is an access network device in a 5G system.

In some possible implementations, an interface between the first node and the anchor node is an N2 interface, and/or an N3 interface, and/or an Xn interface.

In some possible implementations, the method further includes: accessing, by the first node, the anchor node according to an access mode of the terminal device during an initial startup.

In some possible implementations, the method further includes: disconnecting, by the first node, from the anchor node and accessing the anchor node according to the access mode of the relay node after an initial access is successful.

In a second aspect, a relay node is provided, which is used for performing the method of the above first aspect or the method in any possible implementation of the above first aspect. Specifically, the relay node includes units for executing the method of the above first aspect or the method in any possible implementation of the above first aspect.

In a third aspect, a relay node is provided, including a memory, a processor, an input interface, and an output interface. The memory, the processor, the input interface, and the output interface are connected through a bus system. The memory is used for storing instructions, and the processor is used for executing the instructions stored in the memory to perform the method of the above first aspect or any possible implementation mode of the above first aspect.

In a fourth aspect, a computer storage medium is provided for storing computer software instructions for executing the method of the first aspect or any possible implementation of the first aspect, and the computer software instructions include programs designed for executing the above aspects.

In a fifth aspect, a computer program product including instructions is provided, when the instructions are run on a computer, the computer is enabled to perform the method of the first aspect or any one of optional implementations of the first aspect.

In a sixth aspect, a computer program is provided which, when running on a computer, enables the computer to perform the method of the first aspect or any one of optional implementations of the first aspect.

In a seventh aspect, a chip is provided, including: a processor, configured to call and run a computer program from a memory, so that a device on which the chip is mounted performs the method of the first aspect or any one of optional implementations of the first aspect.

BRIEF DESCRIPTION OF DRAWINGS

FIG. 1 shows a diagram of an application scenario according to an implementation of the present disclosure.

FIG. 2 shows a schematic flowchart of a method for relay transmission according to an implementation of the present disclosure.

DETAILED DESCRIPTION

Figure 3:
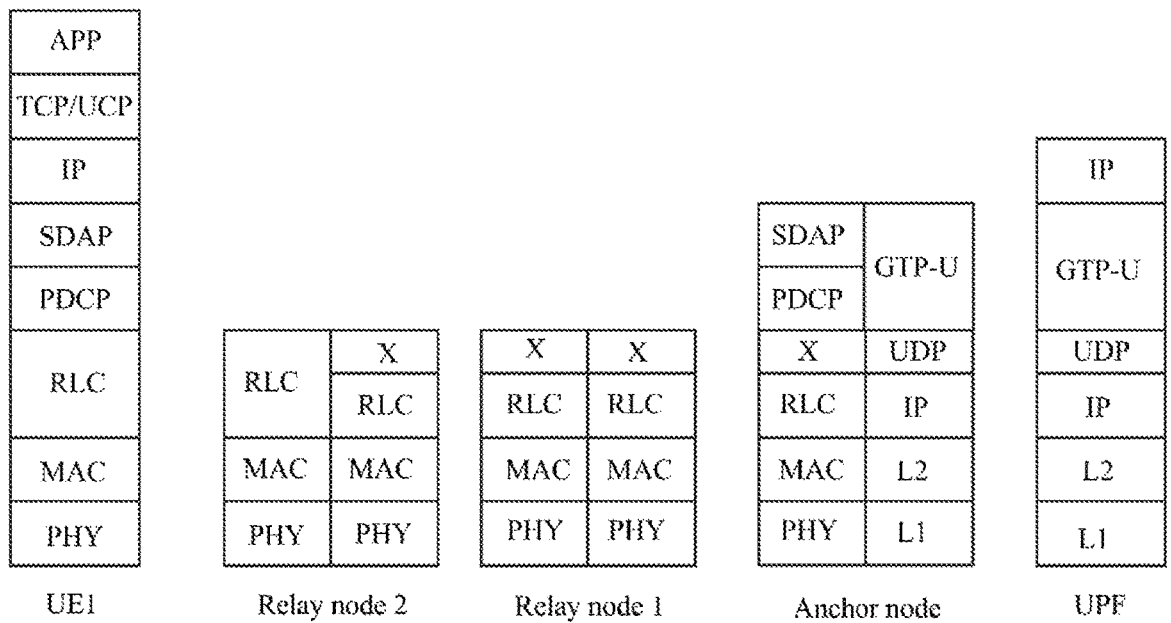
FIG. 3 shows a schematic diagram of an implementation of a method for relay transmission according to an implementation of the present disclosure.

In the following, technical solutions in implementations of the present disclosure will be described in combination with drawings of the implementations of the present disclosure.

The technical solutions of implementations of the present disclosure may be applied to various communication systems, such as a Long Term Evolution (LTE) system, a LTE Frequency Division Duplex (FDD) system, a LTE Time Division Duplex (TDD) system, a Universal Mobile Telecommunications System (UMTS), a Worldwide Interoperability for Microwave Access (WiMAX) communication system, or a future 5G system.

FIG. 1 shows a wireless communication system 100 to which an implementation of the present disclosure is applied. The wireless communication system 100 may include a network device 110. The network device 110 may be a device that communicates with a terminal device. The network device 110 may provide communication coverage for a specific geographical area, and may communicate with a terminal device (e.g., UE) in the coverage area. Optionally, the network device 110 may be an evolutional Node B (eNB or eNodeB) in an LTE system or a radio controller in a Cloud Radio Access Network (CRAN). The network device may be a relay station, an access point, an on-board device, a wearable device, a network-side device in a future 5G network, or a network device in a future evolved Public Land Mobile Network (PLMN), etc.

The wireless communication system 100 further includes at least one terminal device 120 in the coverage area of the network device 110. The terminal device 120 may be mobile or fixed. Optionally, the terminal device 120 may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a future 5G network, or a terminal device in a future evolved Public Land Mobile Network (PLMN), or the like.

In an implementation of the present disclosure, the network device 110 may be an anchor node, or a Donor node, the network device 110 may be wiredly connected with a core network, the network device 110 may directly communicate with the terminal device 120 in a wireless communication system, or may communicate with the terminal device 120 through at least one relay node, such as a relay node 130, wherein, the relay node 130 and the network device 110 communicate through a wireless connection mode, and the relay node 130 and the terminal device 120 may also communicate through a wireless connection mode.

It should be understood that in an implementation of the present disclosure, the relay node 130 may be a network device, for example, various implementations of the aforementioned network device 110, or may be a terminal device, for example, various implementations of the terminal device 120 in the aforementioned implementation, which is not limited in implementations of the present disclosure.

Optionally, a 5G system or network may be referred to as a New Radio (NR) system or network.

Optionally, the wireless communication system 100 may further include other network entities such as a network controller, a mobile management entity, which is not limited in implementations of the present disclosure.

The number of network devices, terminal devices and relay nodes shown in FIG. 1 is only an example and not a limitation. Optionally, the wireless communication system 100 may include multiple network devices and other number of terminal devices may be included in the coverage area of each network device, and other number of relay nodes may also be included between a network device and a terminal device, which is not limited in implementations of the present disclosure.

Since an air interface protocol of a NR system is different from that of an LTE system, and relay technologies based on the LTE system only support single-hop transmission, multi-hop transmission from an anchor node to a relay node needs to be supported in the NR system. In view of this, a method for relay transmission is provided in an implementation of the present disclosure, which may realize multi-hop relay transmission.

FIG. 2 is a schematic flow chart of a method 200 of relay transmission according to an implementation of the present disclosure, as shown in FIG. 2, the method 200 may include acts S210 and S220.

In S210, a relay layer of a first node receives target data sent by a second node, wherein the second node is an anchor node or a relay node, the first node is wirelessly connected with the second node, the anchor node is wiredly connected with the core network, and a destination node of the target data is a third node.

In S220, the relay layer of the first node processes the received target data.

In an implementation of the present disclosure, the first node is a relay node, the first node is configured with a relay layer, the relay layer may be used for establishing a connection with a second node, the relay layer may take a multi-hop routing function, or the relay layer may be configured to establish a topology among relay nodes and realize a path selection function among multiple relay nodes.

In an implementation of the present disclosure, the second node may be an anchor node (or a Donor node), in which case, the first node is the first relay node, or a relay node closest to the anchor node; or, the second node may be another relay node, that is, the target data is forwarded from another relay node, which is not limited in implementations of the present disclosure.

After the target data sent by the second node is received, the first node may process the received target data at the relay layer of the first node to determine whether to forward the target data to another relay node or to submit the target data to an upper layer of the relay layer of the first node for further processing.

Optionally, in an implementation of the present disclosure, the destination node of the target data is a third node, which may be the first node, a terminal device, or a relay node directly connected with the terminal device. An implementation of the present disclosure is not limited to this. Direct connection between the terminal device and the relay node refers to no other relay node between the relay node and the terminal device, i.e., one hop between the relay node and the terminal device is reachable, and no other relay node is required to forward data.

Optionally, in some implementations, S220 may include: the relay layer of the first node forwards the target data to another relay node, or submits the target data to an upper layer of the relay node, or forwards the target data to the terminal device, wherein the terminal device is directly connected with the first node.

For example, if a destination node of the target data is the first node, the relay layer of the first node may submit the target data to the upper layer of the relay layer, and the upper layer of the relay layer further processes the target data; or if a destination node of the target data is a terminal device directly connected with the first node, the relay layer of the first node may also submit the target data to the upper layer of the relay layer, and then the upper layer of the relay layer forwards the target data to the terminal device; or if a destination node of the target data is unreachable from the first node within one hop, the relay layer of the first node may forward the target data to another relay node, and the another relay node may forward the target data to the destination node. For example, the relay layer of the first node may forward the target data to a relay layer of another relay node, and then the another relay node may forward the target data to the third node.

Optionally, in an implementation of the present disclosure, a header of the target data may include a destination end address of the target data, which may be an address of the terminal device to which the target data belongs and/or an address of the relay node directly connected with the terminal device. The first node may determine whether to forward the target data to another relay node or to an upper layer of the relay layer of the first node according to header information of the target data.

Optionally, if the first node is the destination node of the target data, the relay layer of the first node may submit the target data to the upper layer of the relay layer of the first node, so that the upper layer of the relay layer of the first node may further process the target data.

Optionally, if the first node is not the destination node of the target data, the first node may forward the target data to another relay node or the terminal device according to the destination end address in the header of the target data. In this case, the relay layer of the first node may only perform a forwarding function and no longer submit the target data to the upper layer of the relay layer for further processing, or the relay layer of the first node may submit the target data to the upper layer of the relay layer and the upper layer of the relay layer forwards the target data to another relay node or the terminal device.

In summary, the first node may submit received data to the upper layer of the relay layer of the first node when the destination node of the received data is the first node, so that the upper layer of the relay layer of the first node may further process the received data; or, the first node may forward the received data to the destination node or another relay node when the destination node of the received data is another node. For example, the first node may determine which node to forward the data according to the destination end address in the header of the received data.

Optionally, in some implementations, the method 200 further includes: the relay layer of the first node determines a processing mode of the target data according to first indication information, wherein the processing mode of the target data is one of the following: forwarding the target data to the device, forwarding the target data to another relay node, and submitting the target data to the upper layer of the relay layer.

Specifically, before processing the target data, the first node may also determine which processing mode to use to process the target data according to the first indication information, that is, the first node may determine whether to submit the target data to the upper layer of the relay layer, or forward the target data to the terminal device, or forward the target data to another relay node according to the first indication information.

Optionally, in some implementations, the first indication information may be used for indicating at least one of the following: a logical channel identification, whether the target data is sent to the first node, whether the target data is sent to the terminal device directly connected with the first node, whether the target data is sent to the third node, whether the target data is carried on a Data Radio Bearer (DRB), whether the target data is carried on a Signaling Radio Bearer (SRB), an IP address, and port information in an IP message header.

Therefore, the first node may determine the destination node of the target data according to the first indication information, and further may determine the processing mode of the target data. For example, if the destination node of the target data is the first node, the relay layer of the first node may determine to submit the target data to the upper layer of the relay layer, or if the destination node of the target data is the terminal device, the relay layer of the first node may forward the target data to the terminal device, or if the destination node of the target data is another relay node, the first node may forward the target data to another relay node.

By way of example and not limitation, the first indication information is contained in a message header of a Packet Data Unit (PDU) of at least one of the following protocol layers: a relay layer, a Medium Access Control (MAC) layer, a Radio Link Control (RLC) layer, and at least one upper layer of the relay layer.

By way of example and not limitation, at least one upper layer of the relay layer includes at least one of the following: an Internet Protocol (IP) layer, a Packet Data Convergence Protocol (PDCP) layer, a Service Data Adaptation Protocol (SDAP), a Radio Resource Control (RRC) layer, a Non-Access Stratum (NAS) layer, a User Datagram Protocol (UDP) layer, a General Packet Radio Service Tunneling Protocol (GTP) layer, a Stream Control Transmission Protocol (SCTP) layer, a F1 Application Protocol (F1AP) layer.

Optionally, the first indication information may be contained in a header of PDU of another protocol layer, which is not limited in implementations of the present disclosure.

It should be understood that in an implementation of the present disclosure, the upper layer of the relay layer or at least one upper layer of the relay layer may be understood as a protocol layer located above the relay layer, for example, an upper layer adjacent to the relay layer, or an upper layer of the upper layer, and upper layers located above the relay layer may all be considered as upper layers of the relay layer. Implementations of the present disclosure are not specifically limited to this.

Similarly, the upper layer of the upper layer may be an upper layer adjacent to the upper layer, or may be another upper layer above the upper layer, and protocol layers above the upper layer may all be considered to be upper layers of the upper layer.

For example, if an upper layer A, an upper layer B, an upper layer C, and an upper layer D are sequentially arranged from the relay layer upward, an upper layer of the relay layer may be any one of the upper layers A to D. If the upper layer of the relay layer is the upper layer A, an upper layer of the upper layer A may be any one of the upper layers B to D, and so on.

Optionally, in an implementation of the present disclosure, if the first node determines not to forward the target data to another relay node, for example, the first node determines that the destination node of the target data is the first node or the terminal device directly connected with the first node according to the first indication information, in this case, the first node may determine not to forward the target data to another relay node. Further, the relay layer of the first node may determine to submit the target data to the upper layer of the relay layer. Optionally, if the destination node of the first node is the terminal device directly connected with the first node, the upper layer of the relay layer or an upper layer of the upper layer of the relay layer may also forward the target data to the terminal device.

Hereinafter, how the first node determines which upper layer of the relay layer to submit to will be described with reference to specific implementations.

Optionally, as one implementation, the method 200 further includes: if it is determined that the target data is not submitted to another relay node, the relay layer of the first node determines to submit the target data to a first upper layer of the relay layer according to second indication information, wherein the first upper layer is one of at least one upper layer of the relay layer.

Specifically, in the implementation, the relay layer of the first node may determine which upper layer of the relay layer to submit the target data to according to the second indication information. Further, the relay layer of the first node may submit the target data to the upper layer, and optionally, the upper layer may further submit the target data upward. Implementations of the present disclosure do not limit the number of times that the target data is submitted upward.

That is, in the implementation, the relay layer of the first node may first determine to which upper layer the target data is submitted, and then may submit the target data to the upper layer. Optionally, the upper layer may further submit the target data upward, or may not submit the target data upward anymore. Implementations of the present disclosure are not limited to this.

Optionally, if the destination node of the target data is the terminal device directly connected with the first node, the upper layer (which may be the first upper layer) of the relay layer to which the target data is finally submitted may also forward the target data to the terminal device.

Optionally, the relay layer of the first node determines to submit the target data to the first upper layer of the relay layer according to the second indication information, including: the relay layer of the first node determines whether the target data needs to be forwarded to the terminal device according to the second indication information; and the relay layer of the first node determines the first upper layer to which the target data is submitted according to whether the target data needs to be forwarded to the terminal device.

Specifically, the relay layer of the first node may determine whether the target data needs to be forwarded to the terminal device according to the second indication information, that is, determine whether the destination node of the target data is the terminal device directly connected with the first node. If so, the relay layer of the first node may submit the target data to the first upper layer capable of forwarding the target data to the terminal device, that is, the relay layer of the first node may determine the upper layer capable of forwarding the data to the terminal device as the first upper layer. Otherwise, the relay layer of the first node may submit the target data to any upper layer or a specific upper layer of the relay layer, i.e. the first upper layer may be any upper layer or a specific upper layer of the relay layer.

For example, if upper layers of the relay layer include an upper layer A, an upper layer B, and an upper layer C, wherein the upper layer A and the upper layer B may forward the target data to the terminal device, and if the destination node of the target data is the terminal device, the relay layer may determine the first upper layer in the upper layer A and the upper layer B, for example, the upper layer A and/or the upper layer B may be determined as the first upper layer. Further, the target data will be forwarded to the terminal device through the first upper layer, or, if the destination node of the target data is the first node, the relay layer may determine the first upper layer among the upper layer A, the upper layer B, and the upper layer C. For example, any one of the upper layer A, the upper layer B, and the upper layer C may be determined as the first upper layer, and the target data is further processed by the first upper layer.

Further, the relay layer of the first node may submit the target data to the first upper layer. Optionally, if the destination node of the target data is the terminal device directly connected with the first node, the first upper layer may forward the target data to the terminal device, or the first upper layer may further submit the target data upward, and the upper layer to which the target data is finally submitted may forward the target data to the terminal device.

By way of example and not limitation, the second indication information is used for indicating at least one of the following: a logical channel identification, whether the target data is sent to the first node, whether the target data is sent to the terminal device directly connected to the first node, whether the target data is sent to another relay node, whether the target data is carried on a Data Radio Bearer (DRB), whether the target data is carried on a Signaling Radio Bearer (SRB), an IP address, port information in an IP message header, whether the target data is Radio Resource Control (RRC) data, and whether the target data is F1 Application Protocol (F1AP) data.

Optionally, if the target data is the RRC data, in this case, the first node may be considered as the terminal device, the first node decodes the target data according to a format of the RRC data, and may further configure its own radio link according to the target data; optionally, if the target data is the F1AP data, in this case, the first node may be considered as a network device, the first node decodes the target data according to a format of F1AP data, and further may configure the terminal device served by the first node according to the target data.

By way of example and not limitation, the second indication information is contained in a message header of a packet data unit PDU of at least one of the following protocol layers: a relay layer, a Medium Access Control (MAC) layer, a Radio Link Control (RLC) layer, and at least one upper layer of the relay layer.

Optionally, as another implementation, the method 200 may include: if it is determined that the target data is not submitted to another relay node, the relay layer of the first node will submit the target data to the upper layer of the relay layer; and the upper layer of the relay layer determines to submit the target data to a second upper layer of the relay layer according to third indication information, wherein the second upper layer is one of at least one upper layer of the relay layer.

Specifically, in the implementation, the relay layer of the first node may first submit the target data to the upper layer, and then the upper layer determines to submit the target data to the second upper layer of the relay layer according to the third indication information. Further, the upper layer may submit the target data to the second upper layer, and optionally, the second upper layer may further submit the target data upward. Implementations of the present disclosure do not limit the number of times of upward submissions.

Difference between the implementation and the previous implementation is that the relay layer of the first node may first submit the target data upward, and then the upper layer of the relay layer determines to which upper layer the target data is submitted, i.e. in the previous implementation, the relay layer of the first node first makes judgment, determines to which upper layer the data is submitted, and then performs upward submission of the target data. In the implementation, the relay layer of the first node first submits the target data upward, and then the upper layer of the relay layer determines to which upper layer the target data is submitted.

It should be understood that in the implementation, the upper layer of the relay layer may be a protocol layer located above the relay layer, for example, it may be an upper layer protocol layer adjacent to the relay layer, or it may be an upper layer protocol layer of the upper layer protocol layer, etc., and protocol layers located above the relay layer may be all regarded as upper layers of the relay layer. Implementations of the present disclosure are not specifically limited to this. Optionally, in some implementations, the upper layer of the relay layer determines to submit the target data to the second upper layer of the relay layer according to the third indication information, including: the upper layer of the relay layer determines whether the target data needs to be forwarded to the terminal device according to the third indication information; the upper layer of the relay layer determines the second upper layer to which the target data is submitted according to whether the target data needs to be forwarded to the terminal device.

Specifically, the upper layer of the relay layer may determine whether the target data needs to be forwarded to the terminal device according to the third indication information, that is, determine whether the destination node of the target data is the terminal device directly connected with the first node. If so, the upper layer of the relay layer may submit the target data to the second upper layer capable of forwarding the target data to the terminal device, that is, the upper layer of the relay layer may determine the upper layer capable of forwarding the data to the terminal device as the second upper layer, otherwise, the upper layer of the relay layer may submit the target data to any upper layer or a specific upper layer of the relay layer, i.e. the second upper layer may be any upper layer or a specific upper layer of the relay layer.

For example, if upper layers of the relay layer include an upper layer A, an upper layer B, and an upper layer C, wherein the upper layer A and the upper layer B can forward the target data to the terminal device, if the destination node of the target data is the terminal device, the upper layer of the relay layer may determine the second upper layer in the upper layer A and the upper layer B, or if the destination node of the target data is the first node, the upper layer of the relay layer may determine the second upper layer among the upper layer A, the upper layer B and the upper layer C.

Further, the upper layer of the relay layer may submit the target data to the second upper layer. Optionally, if the destination node of the target data is the terminal device directly connected with the first node, the second upper layer may forward the target data to the terminal device, or the second upper layer may further submit the target data upward, and an upper layer to which the target data is finally submitted may forward the target data to the terminal device.

By way of example and not limitation, the third indication information is used for indicating at least one of the following: a logical channel identification, whether the target data is sent to the first node, whether the target data is sent to the terminal device directly connected to the first node, whether the target data is sent to another relay node, whether the target data is carried on a Data Radio Bearer (DRB), whether the target data is carried on a Signaling Radio Bearer (SRB), an IP address, port information in an IP message header, whether the target data is Radio Resource Control (RRC) data, and whether the target data is F1 Application Protocol (F1AP) data.

Optionally, if the target data is the RRC data, in this case, the first node may be considered as the terminal device, the first node decodes the target data according to a format of the RRC data, and may further configure its own radio link according to the target data; or, if the target data is the F1AP data, in this case, the first node may be considered as a network device, the first node decodes the target data according to a format of F1AP data, and further may configure the terminal device served by the first node according to the target data.

By way of example and not limitation, the third indication information is contained in a message header of a packet data unit PDU of at least one of the following protocol layers: a relay layer, a Medium Access Control (MAC) layer, a Radio Link Control (RLC) layer, and at least one upper layer of the relay layer.

Optionally, in an implementation of the present disclosure, the relay layer of the first node may be above the RLC layer of the first node, wherein the RLC layer may be used for Automatic Repeat request (ARQ). In this case, ARQ retransmission may be performed in a point-to-point mode from the anchor node to the first node. At the same time, ARQ retransmission may be carried out between the first node and a next hop node of the first node in a point-to-point mode to ensure lossless data transmission, wherein the next hop node of the first node may be the destination node or may be another relay node.

Optionally, in an implementation of the present disclosure, the relay layer of the first node may be below the PDCP layer, or the relay layer of the first node may be implemented at the PDCP layer of the first node, that is, the relay layer of the first node may be integrated with the PDCP layer. A function of the PDCP layer is used for encryption and integrity protection. Setting the relay layer below the PDCP layer or implementing the relay layer at the PDCP layer may ensure that encryption and integrity protection are completed at the PDCP layer regardless of the number of hops of data forwarding, i.e. may ensure that an end-to-end mode for data transmission is adopted between the anchor node and the third node (i.e. the destination node of the target data), or data initial transmission or data retransmission may be performed through a PDCP connection between the anchor node and the third node.

Optionally, in some implementations, S210 may include: the first node receives the target data sent by the anchor node through the data connection of the terminal device.

Specifically, at the General Packet Radio Service Tunneling Protocol (GTP) layer, each terminal device may have at least one GTP connection, and each data stream may have corresponding Quality-of-Service (QoS) requirements for different data streams. In the implementation, the anchor node may analyze a data flow for each terminal device to correspond to different PDCP entities, and each terminal device has a PDCP connection belonging to each terminal device, wherein the PDCP connection of each terminal device extends from a PDCP layer of the anchor node to a PDCP layer of the terminal device, that is, the PDCP connection may be established between the PDCP entity of the anchor node and the PDCP entity of the terminal device, so that the anchor node may forward the data flow for the terminal device through the PDCP connection corresponding to the terminal device.

Optionally, in some implementations, the S210 may include: the first node receives the target data sent by the anchor node through the data connection of the relay node directly connected with the terminal device.

In the implementation, the anchor node does not distinguish terminal devices to which the data belongs, but distinguish relay nodes to which the data connection of the terminal device belongs. Specifically, the anchor node may combine data flows belonging to the same relay node into one PDCP connection, and then forward the data through the PDCP connection, wherein the PDCP connection is established between the PDCP entity of the anchor node and the PDCP entity of the relay node directly connected with the terminal device, that is, the PDCP connection extends from the PDCP layer of the anchor node to the PDCP layer of the relay node directly connected with the terminal device, so that the anchor node may forward the data flow for the terminal device through the data connection of the relay node directly connected with the terminal device.

Optionally, in some implementations, the first node may establish a connection as a Distributed Unit (DU) with the anchor node as a Center Unit (CU). In this scenario, the first node may have only a part of the protocol layer, for example, the first node may have a physical layer (PHY), a Media Access Control (MAC) layer, an RLC layer, and a PDCP layer, and an interface between the first node and the anchor node is a CU-DU interface.

Optionally, in some implementations, the first node as an access network device may establish a connection with the anchor node. For example, the first node as an access network device (gNB) may establish a connection with the anchor node in a 5G system. In this case, the interface between the first node and the anchor node may be at least one of an N2 interface, an N3 interface, and an Xn interface.

Optionally, in some implementations, the method 200 further includes: the first node accesses the anchor node according to an access mode of the terminal device during an initial startup.

Optionally, in some implementations, the method 200 further includes: after the initial access is successful, the first node disconnects from the anchor node and accesses the anchor node according to an access mode of the relay node.

In other words, during an initial access, the relay node may perform access according to a protocol stack of the terminal device (e.g. access to a relay node, or an indefinite node, or any other node). After relevant configuration information is acquired, the relay node may disconnect and then perform access in a form of the relay node, e.g. select a specific node or access according to a specific access process. In short, the relay node may access in different protocol stacks at different stages to achieve different functions.

Hereinafter, implementation of a method for relay transmission according to implementations of the present disclosure will be described in detail with reference to the specific scenarios shown in FIGS. 3 and 4.

Figure 4:
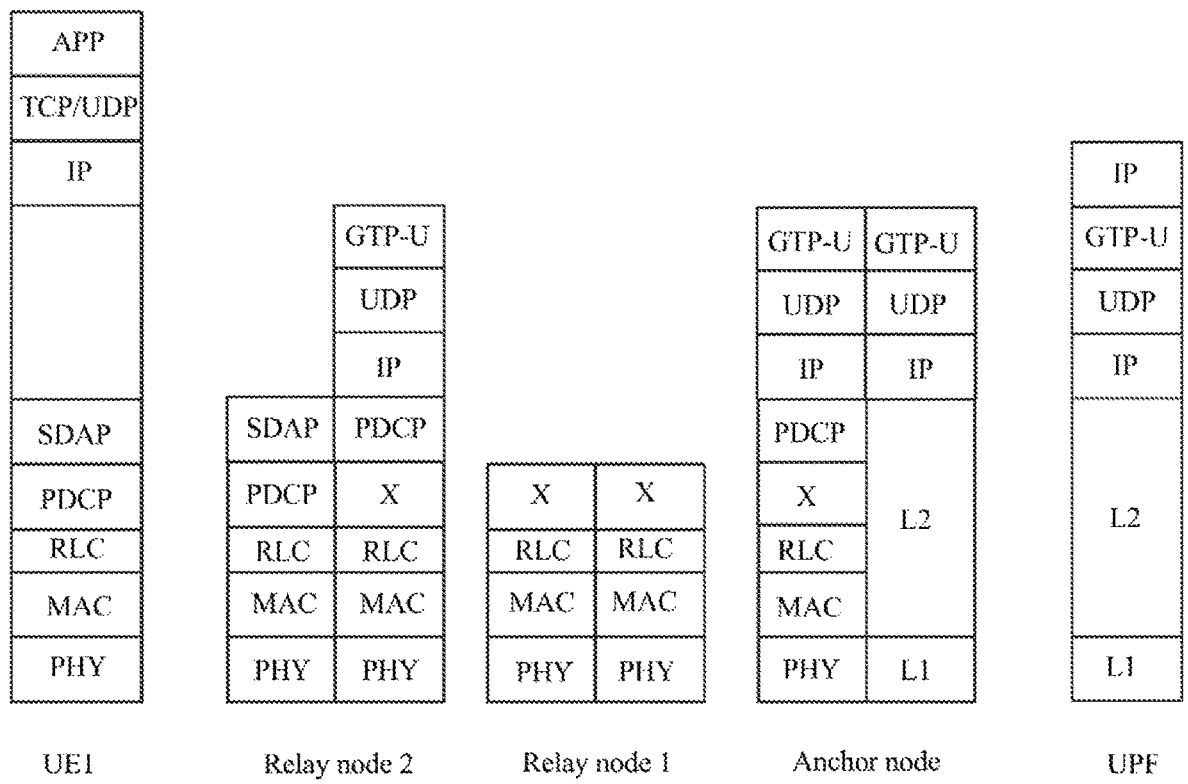
FIG. 4 shows a schematic diagram of another implementation of a method for relay transmission according to an implementation of the present disclosure.

It should be noted that an architecture of a protocol layer of each node shown in FIGS. 3 and 4 is only an example, and the architecture of the protocol layer of each node may be adjusted according to an actual application scenario, which is not specifically limited in implementations of the present disclosure.

It should be understood that FIGS. 3 and 4 only take two-hop scenarios as examples. Of course, the protocol layer architecture shown in FIGS. 3 and 4 is also applicable to one-hop or more-hop scenarios, and implementations of the present disclosure are not specifically limited to this.

It should also be understood that positions of a relay layer (i.e., layer X) shown in FIGS. 3 and 4 are only examples, of course, the relay layer may be at another position in the previous implementations, and implementations of the present disclosure are not limited to this.

In the scenarios shown in FIGS. 3 and 4, a direction of data transmission may be an anchor node→relay node 1→relay node 2→UE1, wherein the anchor node establishes connections with relay layers of the relay node 1 and the relay node 2.

In FIG. 3, the anchor node receives first data from a core network (e.g., User Plane Function (UPF)), and after the first data is received, the anchor node determines that a destination node of the first data is the UE1, so that the anchor node may send the first data to a relay layer of the relay node 1, wherein the relay node 1 is a relay node directly connected with the anchor node. A header of the first data may include an address of the terminal device to which the first data belongs (i.e., an address of the UE1), or may include an address of a relay node directly connected with the terminal device (i.e., an address of the relay node 2).

After the first data is received, the relay node 1 acquires the address of the UE1 and the address of the relay node 2 contained in the first data, and then determines that the destination node of the first data is not the relay node 1 according to the address information, so that the relay layer of the relay node 1 only forwards the first data to the relay node 2 without submitting the first data to the upper layer of the relay layer of the relay node 1 for processing. Therefore, in this data transmission, a protocol stack for the relay node 1 is cut off at the relay layer, that is, there is no other protocol layer above the relay layer.

After the first data forwarded by the relay node 1 is received, the relay node 2 determines that it is a relay node directly connected with the home terminal device of the first data. The relay node 2 does not perform GTP layer processing on the first data and may directly forward the first data to the UE1.

Optionally, the relay node 2 may perform the GTP layer processing on the first data, and then forward the processed first data to the UE1.

Optionally, in the implementation, the anchor node may transmit the first data through a data connection of the UE1, wherein the data connection of the UE1 is a PDCP connection established between a PDCP entity of the anchor node and a PDCP entity of the UE1, that is, the anchor node may transmit the first data through the PDCP connection between the anchor node and the UE1.

It should be understood that in FIG. 3, the relay node 2 is connected with the anchor node as a DU, therefore, the relay node 2 only has a part of the protocol layer, and an interface between the relay node 2 and the anchor node may be a CU-DU interface.

Different from the implementation shown in FIG. 3, in the implementation of FIG. 4, the anchor node may transmit the first data through the data connection of relay node 2 directly connected with the UE1, wherein the data connection of relay node 2 may be a PDCP connection established between a PDCP entity of the anchor node and a PDCP entity of the relay node 2, that is, the first data may be transmitted through the PDCP connection between the anchor node and the relay node 2.

That is, in the implementation shown in FIG. 3, the PDCP connection at the anchor node is for distinguishing UE, while in FIG. 4, the PDCP connection at the anchor node is for relay node.

It should be understood that in FIG. 4, the relay node 2 as an access network device (e.g., a base station) is connected with the anchor node, so the relay node 2 has a protocol stack similar to the access network device. In this case, an interface between the relay node 2 and the anchor node may be at least one of a N2 interface, a N3 interface, and an Xn interface.

It should be understood that in an implementation of the present disclosure, the relay node performs different functions in data transmission, resulting in different corresponding protocol stack architectures. For example, in the data transmission shown in FIGS. 3 and 4, the relay node 1 only performs the forwarding function, so the protocol stack of the relay node 1 is cut off to the relay layer, of course, in another data transmission, if the relay node 1 is a relay node directly connected with the terminal device, the protocol stack of the relay node 1 may have the protocol stack architecture shown for the relay node 2. Similarly, of course, in another data transmission, if the relay node 2 only takes the forwarding function, the protocol stack of the relay node 2 may have the protocol stack architecture shown for the relay node 1.

Therefore, in a method for relay transmission according to an implementation of the present disclosure, the relay layer of the relay node may take a multi-hop routing function, and process the received data is at the relay layer to determine whether to forward the data or submit the data to the upper layer of the relay layer for further processing, so that multi-hop relay communication may be realized and cell coverage of the NR system may be improved.

Method implementations of the present disclosure are described in detail above with reference to FIGS. 2 to 4, apparatus implementations of the present disclosure are described in detail below with reference to FIGS. 5 to 6. It should be understood that the apparatus implementations and the method implementations correspond to each other, and similar description may refer to description of the method implementations.

Figure 5:
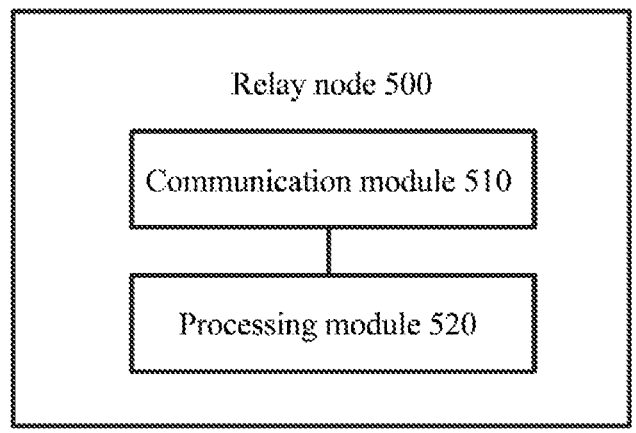
FIG. 5 shows a schematic block diagram of a relay node according to an implementation of the present disclosure.

FIG. 5 shows a block diagram of a relay node 500 according to an implementation of the present disclosure. As shown in FIG. 5, the relay node 500 includes: a communication module 510 is configured to receive target data sent by a second node, wherein the second node is an anchor node or a relay node, the relay node is wirelessly connected with the second node, the anchor node is wiredly connected with a core network, and a destination node of the target data is a third node; and a processing module 520 is configured to process the received target data.

It should be understood that the relay node 500 according to an implementation of the present disclosure may correspond to the first node in the method implementation of the present disclosure, and the above and other operations and/or functions of various units in the relay node 500 are respectively for realizing the corresponding processes of the first node in the method 200 shown in FIG. 2, and will not be repeated here for brevity.

Figure 6:
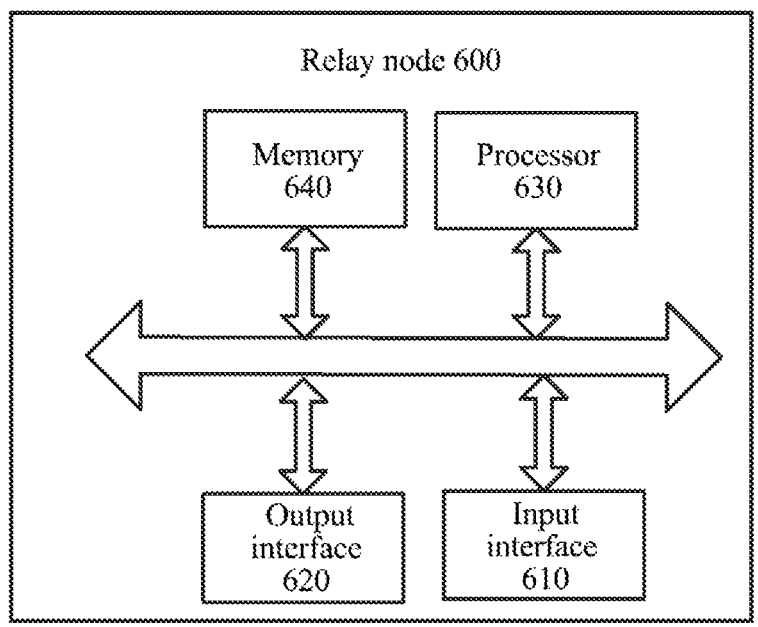
FIG. 6 shows a schematic block diagram of a relay node according to another implementation of the present disclosure.

As shown in FIG. 6, an implementation of the present disclosure also provides a relay node 600, which may be the relay node 500 in FIG. 5 and may be configured to execute contents of the first node corresponding to the method 200 in FIG. 2. The relay node 600 includes an input interface 610, an output interface 620, a processor 630, and a memory 640, wherein the input interface 610, the output interface 620, the processor 630, and the memory 640 may be connected through a bus system. The memory 640 is used for storing programs, instructions, or codes. The processor 630 is configured to execute programs, instructions, or codes in the memory 640 to control the input interface 610 to receive signals, to control the output interface 620 to send signals, and to complete the operations in the foregoing method implementations.

In one implementation, the relay node 600 may be a chip, which may include an input circuit or interface for sending information or data, an output circuit or interface for receiving information or data, etc.

In the implementation, the chip may be applied to the network device in an implementation of the present disclosure, and the chip may implement the corresponding processes implemented by the network device in the various methods in the implementations of the present disclosure, which will not be repeated here for the sake of brevity.

Optionally, the chip may be applied to the terminal device in the implementations of the present disclosure, and the chip may implement the corresponding processes implemented by the terminal device in the various methods in the implementations of the present disclosure, which will not be repeated here for the sake of brevity.

In another implementation, the relay node 600 may be a communication device (e.g., the terminal device or the network device mentioned in the implementation of the present disclosure, etc.), which may include a transmitter for transmitting information or data and a receiver for receiving information or data.

In the implementation, the communication device may be the network device of the implementation of the present disclosure, and the chip may implement the corresponding processes implemented by the network device in each method of the implementation of the present disclosure, which will not be repeated here for the sake of brevity.

Optionally, the communication device may be the terminal device of the implementation of the present disclosure, and the communication device may implement the corresponding processes implemented by the terminal device in the various methods of an implementation of the present disclosure, which will not be repeated here for the sake of brevity.

It should be understood that, in an implementation of the present disclosure, the processor 630 may be a Central Processing Unit (CPU), or the processor 630 may be another general purpose processor, a Digital Signal Processor (DSP), an Application Specific Integrated Circuit (ASIC), a Field Programmable Gate Array (FPGA), or another programmable logic device, a discrete gate, or a transistor logic device, or a discrete hardware component, etc. The general purpose processor may be a microprocessor, or the processor may be any conventional processor or the like.

The memory 640 may include a read-only memory and a random access memory, and provide instructions and data to the processor 630. A portion of memory 640 may include non-transitory random access memory. For example, the memory 640 may also store information of device types.

In implementation processes, various contents of the methods described above may be accomplished by integrated logic circuits of hardware or instructions in the form of software in the processor 630. The contents of the method disclosed in connection with implementations of the present disclosure may be directly embodied to be accomplished by an execution of the hardware processor or by the combination of hardware and software modules in the processor. The software modules may be located in a storage medium commonly used in the art, such as a random access memory, a flash memory, a read-only memory, a programmable read-only memory, or an electrically erasable programmable memory, or a register. The storage medium is located in the memory 640, and the processor 630 reads the information in the memory 640, and accomplishes the contents of the above methods in combination with its hardware. In order to avoid repetition, it will not be described in detail here.

In a specific implementation, the communication module 510 in FIG. 5 may be implemented by the input interface 610 and the output interface 620 of FIG. 6, and the determination module 520 in FIG. 5 may be implemented by the processor 630 of FIG. 6.

Figure 7:
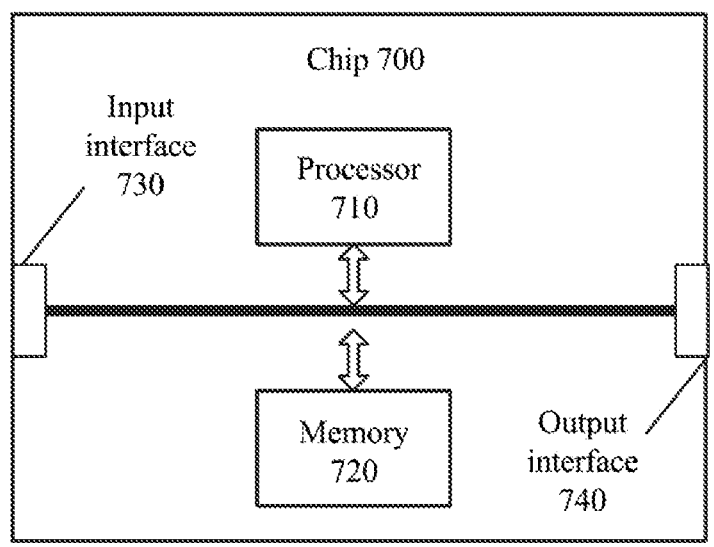
FIG. 7 shows a schematic diagram of a structure of a chip according to an implementation of the present disclosure.

FIG. 7 is a schematic diagram of a structure of a chip according to an implementation of the present disclosure. The chip 700 shown in FIG. 7 includes a processor 710 that may call and run a computer program from a memory to implement the method in the implementation of the present disclosure.

Optionally, as shown in FIG. 7, the chip 700 may further include a memory 720. The processor 710 may call and run a computer program from the memory 720 to implement the method in the implementation of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 710 may acquire information or data sent by other devices or chips.

Optionally, the chip 700 may further include an output interface 740. The processor 710 may control the output interface 740 to communicate with other devices or chips, specifically, may output information or data to other devices or chips.

Optionally, the chip may be applied to the network device in the implementation of the present disclosure, and the chip may implement the corresponding processes implemented by the network device in the various methods in the implementations of the present disclosure, which will not be repeated here for the sake of brevity.

Optionally, the chip may be applied to a mobile terminal/terminal device in the implementation of the present disclosure, and the chip may implement the corresponding processes implemented by the mobile terminal/terminal device in the various methods in the implementations of the present disclosure, which will not be repeated here for brevity.

It should be understood that the chip mentioned in implementations of present disclosure may be referred to as a system-level chip, a system chip, a chip system, or a system-on-chip chips, etc.

It should be understood that the processor in the implementation of the present disclosure may be an integrated circuit chip with a capability for processing signals. In the implementation process, the actions of the method implementations described above may be accomplished by integrated logic circuits of hardware in the processor or instructions in the form of software. The above processor may be a general purpose processor, a Digital Signal Processor (DSP), an Application Specific Integrated Circuit (ASIC), a Field Programmable Gate Array (FPGA), or another programmable logic device, a discrete gate, or a transistor logic device, or a discrete hardware component. The processor may implement various methods, acts and logic block diagrams disclosed in the implementations of the present disclosure. The general purpose processor may be a microprocessor, or the processor may be any conventional processor or the like. The actions of the method disclosed in connection with the implementations of the present disclosure may be directly embodied by the execution of the hardware decoding processor, or by the execution of a combination of hardware and software modules in the decoding processor. The software modules may be located in a storage medium commonly used in the art, such as a random access memory, a flash memory, a read-only memory, a programmable read-only memory, or an electrically erasable programmable memory, or a register. The storage medium is located in the memory, and the processor reads the information in the memory and completes the actions of the above method in combination with its hardware.

It should be understood that the memory in the implementations of the present disclosure may be a transitory memory or non-transitory memory, or may include both transitory and non-transitory memories. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but not limited to, these and any other suitable types of memories.

It should be understood that, the foregoing memory is an example for illustration and should not be construed as limiting. For example, the memory in THE implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, the memories of the present disclosure are intended to include, but are not limited to, these and any other suitable types of memories.

An implementation of the present disclosure further provides a computer-readable storage medium for storing a computer program.

Optionally, the computer readable storage medium may be applied to the network devices in the implementations of the present disclosure, and the computer program enables the computer to execute the corresponding processes implemented by the network devices in the various methods of the implementations of the present disclosure, which will not be repeated here for brevity.

Optionally, the computer-readable storage medium may be applied to a mobile terminal/terminal device in the implementation of the present disclosure, and the computer program enables the computer to execute the corresponding processes implemented by a mobile terminal/terminal device in the various methods in the implementations of the present disclosure, which will not be repeated here for brevity.

An implementation of the present disclosure also provides a computer program product, including computer program instructions.

Optionally, the computer program product may be applied to the network devices in the implementations of the present disclosure, and the computer program instructions enable the computer to execute the corresponding processes implemented by the network devices in the various methods of the implementations of the present disclosure, which will not be repeated here for the sake of brevity.

Optionally, the computer program product may be applied to the mobile terminal/terminal device in the implementation of the present disclosure, and the computer program instructions enable the computer to execute the corresponding processes implemented by the mobile terminal/terminal device in the various methods in the implementations of the present disclosure, which will not be repeated here for brevity.

An implementation of the present disclosure also provides a computer program.

Optionally, the computer program may be applied to the network device in the implementation of the present disclosure. When the computer program is run on the computer, the computer is caused to execute the corresponding processes implemented by the network device in the various methods in the implementations of the present disclosure. For the sake of brevity, the details will not be repeated here.

Optionally, the computer program may be applied to a mobile terminal/terminal device in the implementation of the present disclosure. When the computer program is run on the computer, the computer is enabled to execute the corresponding processes implemented by the mobile terminal/terminal device in the various methods in the implementations of the present disclosure. For the sake of brevity, it will not be repeated here.

Those of ordinary skill in the art will recognize that the example units and algorithm acts described in combination with the implementations disclosed herein can be implemented in electronic hardware, or a combination of computer software and electronic hardware. Whether these functions are implemented in hardware or software depends on the specific application and design constraints of the technical solutions. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In some implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. The aforementioned storage medium includes various medium capable of storing program codes, such as a U disk, a mobile hard disk, a Read-Only Memory (ROM), a Random Access Memory (RAM), a magnetic disk, or an optical disk.

What are described above are merely example implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for relay transmission, comprising:
receiving, by a relay layer of a first node, target data sent by a second node, wherein the second node is an anchor node, wherein the first node is wirelessly connected with the second node, wherein the anchor node is wiredly connected with a core network, wherein a destination node of the target data is a third node, and wherein the third node is a a relay node directly connected with a terminal device; and
processing, by the relay layer of the first node, the received target data,
wherein receiving, by the first node, data sent by the anchor node comprises:
receiving, by the first node, the target data sent by the anchor node through data connection of the relay node directly connected with the terminal device, wherein the relay node directly connected with the terminal device is configured to perform General Packet Radio Service Tunnel Protocol (GTP) layer processing on the target data and forward the target data to the terminal device through a data bearer of the terminal device.

2. The method of claim 1, wherein processing, by the relay layer of the first node, the received target data, comprises:
submitting, by the relay layer of the first node, the target data to an upper layer of the relay layer.

3. The method of claim 1, wherein processing, by the relay layer of the first node, the received target data, comprises:
forwarding, by the relay layer of the first node, the target data to another relay node.

4. The method of claim 1, wherein processing, by the relay layer of the first node, the received target data, comprises:
forwarding, by the relay layer of the first node, the target data to a terminal device, wherein the first node is directly connected with the terminal device.

5. The method of claim 4, wherein forwarding, by the relay layer of the first node, the target data to the terminal device, comprises:
submitting, by the relay layer of the first node, the target data to an upper layer of the relay layer; and
forwarding, by the upper layer of the relay layer, the target data to the terminal device.

6. The method of claim 1, wherein the method further comprises:
determining, by the relay layer of the first node, a processing mode of the target data according to first indication information, wherein the processing mode of the target data is one of:
forwarding the target data to the terminal device, forwarding the target data to another relay node, or submitting the target data to an upper layer of the relay layer.

7. The method of claim 6, wherein the indication information is used for indicating at least one of:
a logical channel identification, whether the target data is sent to the first node, whether the target data is sent to the terminal device directly connected with the first node, whether the target data is sent to another relay node, whether the target data is carried on a Data Radio Bearer (DRB), whether the target data is carried on a Signaling Radio Bearer (SRB), an IP address, or port information in an IP message header.

8. The method of claim 6, wherein the first indication information is contained in a message header of a Packet Data Unit (PDU) of at least one of the following protocol layers:
a relay layer, a Medium Access Control (MAC) layer, a Radio Link Control (RLC) layer, or at least one upper layer of the relay layer.

9. The method of claim 6, wherein the method further comprises:
based on a determination that the target data is not submitted to another relay node, determining, by the relay layer of the first node, to submit the target data to a first upper layer of the relay layer according to second indication information, wherein the first upper layer is one of at least one upper layer of the relay layer.

10. The method of claim 9, wherein determining, by the relay layer of the first node, to submit the target data to a first upper layer of the relay layer according to second indication information, comprises:
determining, by the relay layer of the first node, whether the target data needs to be forwarded to the terminal device according to the second indication information; and
determining, by the relay layer of the first node, the first upper layer to which the target data is submitted according to whether the target data needs to be forwarded to the terminal device.

11. The method of claim 9, wherein submitting, by the relay layer of the first node, the target data to the upper layer of the relay layer, comprises:
submitting, by the relay layer of the first node, the target data to the first upper layer.

12. The method of claim 9, wherein the second indication information is used for indicating at least one of:

a logical channel identification, whether the target data is sent to the first node, whether the target data is sent to the terminal device directly connected with the first node, whether the target data is sent to another relay node, whether the target data is carried on a Data Radio Bearer (DRB), whether the target data is carried on a Signaling Radio Bearer (SRB), an IP address, port information in an IP message header, whether the target data is Radio Resource Control (RRC) data, or whether the target data is F1 Application Protocol (FLAP) data.

13. The method of claim 9, wherein the second indication information is contained in a message header of a Packet Data Unit (PDU) of at least one of the following protocol layers:
a relay layer, a Medium Access Control (MAC) layer, a Radio Link Control (RLC) layer, or at least one upper layer of the relay layer.

14. The method of claim 6, wherein the method further comprises:
based on a determination that the target data is not submitted to another relay node, submitting, by the relay layer of the first node, the target data to the upper layer of the relay layer; and
determining, by the upper layer of the relay layer, to submit the target data to a second upper layer of the relay layer according to third indication information, wherein the second upper layer is one of at least one upper layer of the relay layer.

15. The method of claim 14, wherein determining, by the upper layer of the relay layer, to submit the target data to a second upper layer of the relay layer according to third indication information, comprises:
determining, by the upper layer of the relay layer, whether the target data needs to be forwarded to the terminal device according to the third indication information; and
determining, by the upper layer of the relay layer, the second upper layer to which the target data is submitted according to whether the target data needs to be forwarded to the terminal device.

16. The method of claim 14, wherein the third indication information is used for indicating at least one of:
a logical channel identification, whether the target data is sent to the first node, whether the target data is sent to the terminal device directly connected with the first node, whether the target data is sent to another relay node, whether the target data is carried on a Data Radio Bearer (DRB), whether the target data is carried on a Signaling Radio Bearer (SRB), an IP address, port information in an IP message header, whether the target data is Radio Resource Control (RRC) data, or whether the target data is F1 Application Protocol (FLAP) data.

17. The method of claim 1, wherein the relay layer of the first node is realized on a Packet Data Convergence Protocol (PDCP) layer or the relay layer of the first node is below the Packet Data Convergence Protocol (PDCP) layer.

18. A non-transitory storage medium for storing a computer program that enables a computer to perform the method according to claim 1.

19. A relay node, comprising:
an input interface, configured to receive target data sent by a second node, wherein the second node is an anchor node, wherein the relay node is wirelessly connected with the second node, wherein the anchor node is wiredly connected with a core network, and wherein a destination node of the target data is a third node, and wherein the third node is a relay node directly connected with a terminal device; and
a processor, configured to process the received target data, wherein the input interface is further configured to receive the target data sent by the anchor node through data connection of the relay node directly connected with the terminal device, wherein the relay node directly connected with the terminal device is configured to perform General Packet Radio Service Tunnel Protocol (GTP) layer processing on the target data and forward the target data to the terminal device through a data bearer of the terminal device.

* * * * *